United States Patent [19]
Bearse et al.

[11] Patent Number: 5,950,004
[45] Date of Patent: Sep. 7, 1999

[54] MODEL-BASED PROCESS FOR TRANSLATING TEST PROGRAMS

[75] Inventors: Timothy M. Bearse, Tiverton; Michael L. Lynch, Portsmouth, both of R.I.; James Souza, New Bedford; Edward L. Gagnon, Fall River, both of Mass.

[73] Assignee: The United States of America as represented by the Secretary of the Navy, Washington, D.C.

[21] Appl. No.: 08/713,896

[22] Filed: Sep. 13, 1996

[51] Int. Cl.$^6$ .................................................... G06F 9/45

[52] U.S. Cl. ...................... 395/705; 395/707; 395/710; 395/704; 395/500.04; 395/500.05; 714/33; 714/40; 714/25; 714/736

[58] Field of Search ................................. 395/705, 704, 395/708, 707, 710, 183.08–183.09, 183.16, 183.22, 183.01, 500; 371/25.1, 26, 22.3; 714/32, 33, 40, 46, 25, 736, 737, 734, 735, 738, 742; 706/45, 911, 916, 920

[56] References Cited

U.S. PATENT DOCUMENTS

| | | | |
|---|---|---|---|
| 4,228,537 | 10/1980 | Henckels et al. | 395/183.09 |
| 4,819,233 | 4/1989 | Delucia et al. | 395/704 |
| 5,265,254 | 11/1993 | Blasciak et al. | 395/704 |
| 5,450,586 | 9/1995 | Kuzara et al. | 395/704 |
| 5,651,111 | 7/1997 | McKeeman et al. | 395/183.14 |
| 5,671,416 | 9/1997 | Elson | 395/702 |

OTHER PUBLICATIONS

Simpson et al., "A hierarchical approach to system–level diagnostics(avionics)," IEEE/AIAA/NASA 9th Proceedings of Digital Avionics Systems Conference, Oct. 1990, pp. 254–259.

Sheppard et al., "Uncertainty computations in model–based diagnostics," AUTOTESTCON '91, IEEE Systems Readiness Technology Conference, Improving Systems Effectiveness in the Changing Environment of the '90s, Conference Record, pp. 233–241, Sep. 91.

Sheppard, J.W., "Standardizing diagnostic models for system test and diagnosis," AUTOTESTCON '94, IEEE Systems Readiness Technology Conference, Cost Effective Support Into the Next Century, Conference Proceedings, pp. 343–349, Sep. 94.

*Primary Examiner*—Tariq R. Hafiz
*Assistant Examiner*—Tuan Q. Dam
*Attorney, Agent, or Firm*—Michael J. McGowan; Prithvi C. Lall; Michael F. Oglo

[57] ABSTRACT

A model-based process for translating test programs from a first computer language to a second computer language includes the steps of extracting test strategy and replaceable item callouts from an existing test program in the first language, converting the extracted test strategy into an asymmetric dependency model, converting the dependency model into a model-based test strategy, extracting code segments from the existing test program, translating the extracted code segments into the second language, and merging the model-based test strategy and the translated code segments into a new test program in the second language.

11 Claims, 2 Drawing Sheets

MODEL-BASED PROCESS FOR TRANSLATING TEST PROGRAMS

STATEMENT OF GOVERNMENT INTEREST

The invention described herein may be manufactured and used by or for the Government of the United States of America for governmental purposes without the payment of royalties thereon or therefor.

BACKGROUND OF THE INVENTION

(1) Field of the Invention

The invention relates to computerized test programs and is directed more particularly to translation of a test program from a first computer language to a test program in a second computer language.

(2) Description of the Prior Art

A test program consists of a well-defined sequence of instructions in a specific test-based computer language which results in an automatic test station (1) applying stimuli to a unit under test, and (2) recording measurements of various parameters received responsive to the stimuli to confirm that the parameters are within specified tolerances. The test program further includes branching instructions which are used to control the flow of the program.

Test programs are currently translated from one computer language into another by converting test program code, line by line, from the existing test language into the language of the target automated test system. There are substantial disadvantages to this approach: (1) typically, line by line translation fails to take into account the test strategy employed when executing the existing test program; (2) line by line translations are inadequate when changes are needed to the translated test program; (3) it is very difficult to assess the performance and validity of the translated test program; and (4) current translation processes, whether manual or automated, generally are labor intensive, and/or too costly, and/or simply ineffective.

Accordingly, there is a need for a novel process for translating test programs from one computer language into a second computer language, which process includes retention of the test strategy employed in the existing test program, is not totally dependent upon a line by line translation, which results in a new language test program which is relatively easy to assess from a performance and validity standpoint, and which is relatively less labor intensive and less costly than processes employed heretofore.

SUMMARY OF THE INVENTION

It is, therefore, an object of the invention to provide a novel model-based process for translating test programs from one computer language into a second computer language, which process retains the test strategy employed in the existing test program, is only partially dependent upon a limited line by line translation, and which results in a new language test program which is relatively easy to assess from performance and validity standpoints, and which is relatively less labor intensive and less costly than the heretofore employed processes.

With the above and other objects in view, as will hereinafter appear, a feature of the present invention is the provision of a model-based process for translating test programs from a first computer language to a second computer language, the process comprising the steps of extracting test strategy and replaceable item callouts from an existing test program in the first language, converting the extracted test strategy and replaceable item callouts from the existing test program into an asymmetric dependency model, converting the asymmetric dependency model into a model-based test strategy, extracting code segments from the existing test program for individual translation, translating the extracted code segments into the second language, and merging the model-based test strategy and the translated code segments into a new test program.

The above and other features of the invention, including various novel details and combinations of process steps, will now be more particularly described with reference to the accompanying drawings and pointed out in the claims. It will be understood that the particular process embodying the invention is shown and described by way of illustration only and not as a limitation of the invention. The principles and features of this invention may be employed in various and numerous embodiments without departing from the scope of the invention.

BRIEF DESCRIPTION OF THE DRAWING

Reference is made to the accompanying drawings in which is shown an illustrative embodiment of the invention, from which its novel features and advantages will be apparent.

In the drawings.

DESCRIPTION OF THE PREFERRED EMBODIMENT

The purpose of this invention is to provide a process for translating test programs from one computer test language into a completely different computer test language. The invention provides a process employing model-based technology for translating existing test programs between two different test languages such that the translated test program may be executable on re-targeted automatic test stations.

Figure 1:
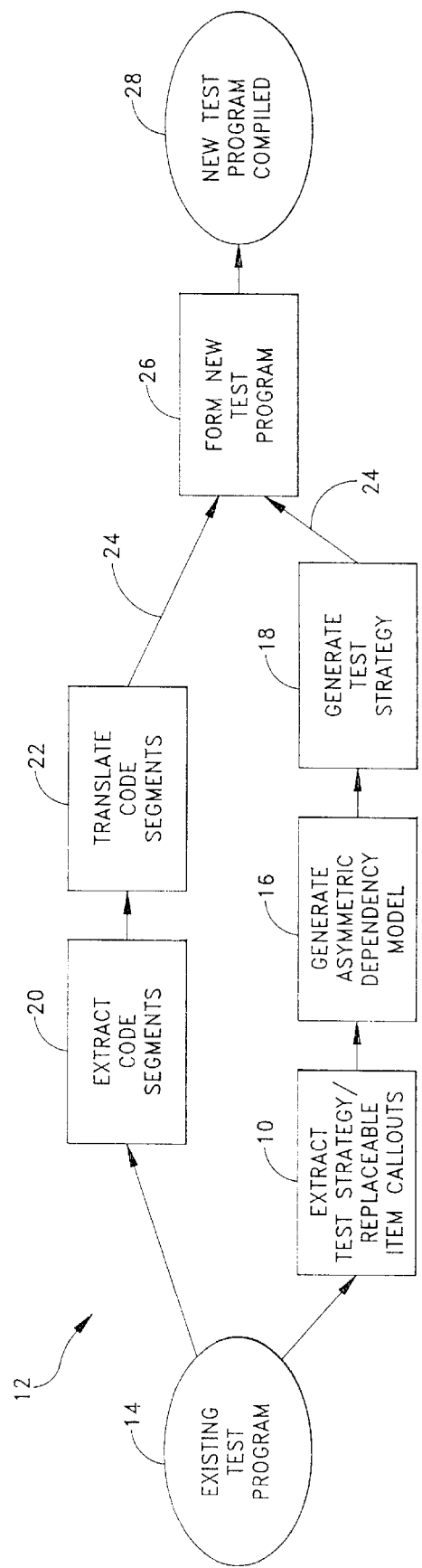
FIG. 1 is a flow chart depicting one form of process illustrative of an embodiment of the invention.

Referring to FIG. 1, it will be seen that one step 10 of the inventive process 12 involves extracting test strategy and replaceable item callouts from an existing test program 14. In this first step 10 of the process 12, the existing test program 14 is parsed to extract the underlying test strategy and replaceable item callouts at each terminal node in the test strategy.

By "parsing" is meant extracting the test strategy, which entails (1) identifying the code segments for performing the tests, and (2) identifying the branching, or flow, between the code segments. The test strategy may be extracted by any selected one of several known techniques. The test strategy is the structure, i.e., the sequence and flow, of the tests, that is, the "test tree" or underlying "if—then" (i.e., PASS/FAIL) structure inherent in the test program. The test strategy contains the sequence of tests to be executed, as well as the appropriate branching decisions, based on the outcome of each test. Replaceable item callouts are used to identify the base level modules/components of a device or unit under test that are identified for replacement or repair by the tests within a given test strategy.

Figure 2:
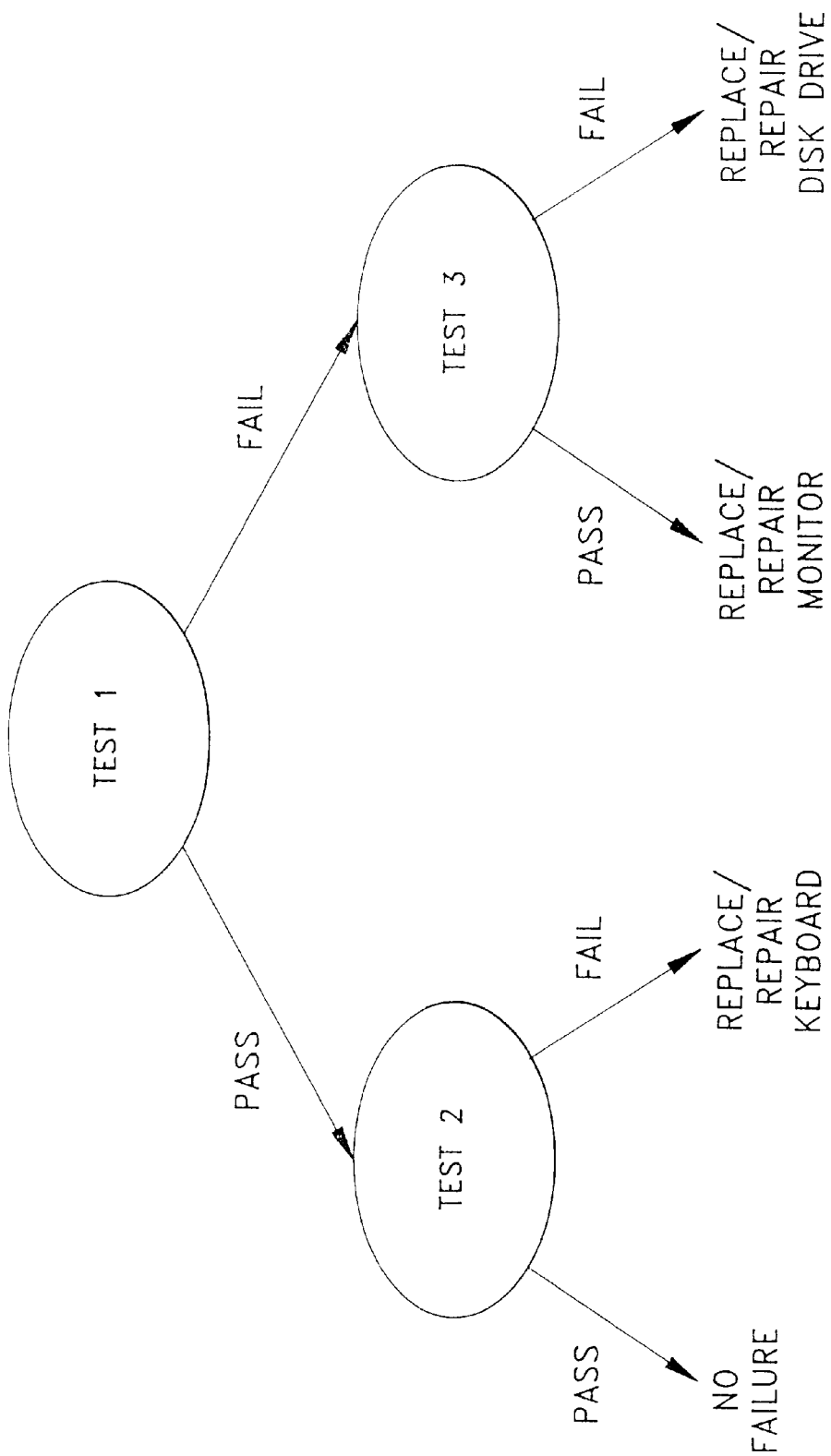
FIG. 2 is a flow chart illustrative of a test strategy and replaceable item callouts.

In FIG. 2, there is shown an exemplary test strategy for testing a personal computer system, and replaceable item callouts. The test strategy of FIG. 2 includes three tests and identifies, at the terminal nodes of the test strategy, three components of the system for repair or replacement. These three components, the keyboard, monitor, and disk drive, identified for repair or replacement at the terminal nodes, are the replaceable item callouts.

The extracted test strategy and replaceable item callouts are used to generate an asymmetric dependency model. In this step 16 of the process 12, the extracted test strategy and replaceable item callouts from the existing test program 14 are converted into an asymmetric dependency model. A dependency model of a unit under test represents the inferences or conclusions that can be drawn when a test passes or when a test fails. In this type of model, each test has two diagnostic inference lists associated with it: (1) a list of failure modes that can be cleared when the test passes, and (2) a list of failure modes that are to be suspect when the test fails. An asymmetric dependency model results when the two diagnostic inference lists associated with any specific test do not contain the same failure modes.

In extracting the test strategy and replaceable item callouts from an existing test program to generate the asymmetric dependency model, a one-to-one relationship exists between the replaceable item callouts and the failure modes. The two diagnostic inference lists are created for each specific test within the test strategy by analyzing the test strategy and replaceable item callouts. The list of failure modes that can be cleared when a specific test passes can be compiled by identifying all the failure modes that will cause the test to fail and building a list of these identified failure modes.

The list of failure modes that are to be suspect when a specific test fails is built by assembling a list of all possible failure modes for the test strategy and then removing from the list of possible failure modes any failure mode which will not cause the specific test to fail.

Referring to FIG. 2, it will be seen that in the test strategy shown, a list of failure modes that can be cleared when TEST 3 passes comprises the disk drive. The list of failure modes that are to be suspect when TEST 3 fails comprises the keyboard and the disk drive. For TEST 2, the list that can be cleared when passed comprises the keyboard, and the list of failure modes that are suspect when TEST 2 fails comprises the keyboard monitor and disk drive. For TEST 1, the list that can be cleared if TEST 1 passes is the monitor and disk drive, and the list of failure modes that are suspect when TEST 1 fails are the monitor and disk drive. Thus, the dependency lists for TEST 1 are not asymmetric.

After generating the asymmetric dependency model, the next step 18 is to convert the asymmetric dependency model into a model-based test strategy. The asymmetric dependency model is analyzed and a model-based test strategy generated.

Simultaneously with the extraction of test strategies and replaceable item callouts from the existing test program in step 10, step 20 may be undertaken, which involves extracting code segments from the existing test program. In this step 20 of the process 12, code segments from the existing test program 14 are identified and extracted for individual translation.

Following the extraction 20 of selected code segments from the existing test program 14, each individual code segment is translated 22 into the new language using either manual or automated techniques.

After translation 22 of code segments from the existing test program 14 and after generation 18 of a test strategy, the translated code segments, which are in the new test language, are merged 24 with the model-based test strategy to form 26 a new test program which may then be compiled and executed 28 on the target automatic test station (not shown). The merger of the new test strategy and the translated code segments is effected in three steps, including (1) reading the new test strategy, (2) creating the branching, or flow, structure, and (3) entering the translated code segments into the new flow structure.

The proposed process uses the concepts of a fixed test strategy and an asymmetric dependency model in order to translate existing test programs into new test programs.

The advantages of this process become apparent when one needs to make changes to the new test program after translating to the new test language on a different test station. This new test program translation process is model-based, which means that when the translated test program is complete, one has a model that is representative of the test program. The primary advantages in this process are the ability to assess the performance and validity of the model, which reflects the new test program, using model-based testability analysis tools, and the ability to easily change the model, and subsequently the test program, in addition to the ability to assess these changes before assembling the final executable test program.

The impact of adding to, or deleting tests from, the test program can be assessed before it is integrated into a test station. Cost savings are achieved using this process because integration of the test program and an interface device with a test station is not necessary until the parameters associated with the test program are considered to be satisfactory. In addition, the model-based nature of the process enables the test program developer to optimize time and money expended in the translation effort.

The means for implementing any of the steps in the process can be automatic, using software, or manual.

It is to be understood that the present invention is by no means limited to the particular series of steps herein disclosed and/or shown in the drawings, but also comprises any modifications or equivalents within the scope of the claims.

What is claimed is:

1. A model-based process for translating test programs from a first computer language to a second computer language, the process comprising the steps of:

extracting test strategy and a plurality of replaceable item callouts from an existing test program in said first computer language, said existing test program comprising a plurality of tests;

formulating a test strategy by listing said plurality of item callouts to be cleared from causing the failure on passage of one of said existing test program tests and by listing said plurality of item callouts to be suspected on failure of one of said existing test program tests;

converting said extracted test strategy from the existing test program into an asymmetric dependency model;

converting the asymmetric dependency model into a model-based test strategy;

extracting code segments from the existing test program for individual translation;

translating the extracted code segments into said second language; and merging the model-based test strategy and the translated code segments into a new test program.

2. The process in accordance with claim 1 wherein said existing test program is parsed to extract said test strategy and said replaceable item callouts from said existing test program.

3. The process in accordance with claim 2 wherein said extracted test strategy includes a sequence of instructions relative to the application of stimuli to a unit under test.

4. The process in accordance with claim 3 wherein said instructions include branching instructions based upon responses of said unit to said stimuli.

5. The process in accordance with claim 3 wherein said dependency model includes a first inference list of failure modes that can be cleared when a test passes, and a second inference list of failure modes that are suspect when a test fails.

6. The process in accordance with claim 5 wherein said test strategy includes a sequence of tests to be conducted and branching decisions based upon the outcome of said tests.

7. The process in accordance with claim 6 wherein said code segments are identified prior to said extraction from the existing test program and said translating of the extracted code segments into said second language is conducted by a selected one of by automated translation and by manual translation.

8. The process in accordance with claim 7 wherein said translated code segments, in said second language, and said model-based test strategy are merged and compiled to form said new test program, which is adapted for application to said unit under test.

9. The process in accordance with claim 1 wherein said code segments are identified prior to said extraction from the existing test program.

10. The process in accordance with claim 9 wherein said translating of the extracted code segments into said second language is conducted by automated translation.

11. The process in accordance with claim 1 wherein said steps are performed a selected one of automatically and manually.

* * * * *